United States Patent
Adderly

(10) Patent No.: US 9,912,997 B2
(45) Date of Patent: Mar. 6, 2018

(54) SYSTEM AND METHOD TO DETERMINE CONTENT ITEMS AND ASSOCIATED TOGGLE TRIGGERS FOR A VIEWER

(71) Applicant: Darryl Adderly, Morrisville, NC (US)

(72) Inventor: Darryl Adderly, Morrisville, NC (US)

(*) Notice: Subject to any disclaimer, the term of this patent is extended or adjusted under 35 U.S.C. 154(b) by 0 days.

(21) Appl. No.: 14/636,659

(22) Filed: Mar. 3, 2015

(65) Prior Publication Data
US 2016/0261922 A1 Sep. 8, 2016

(51) Int. Cl.
| H04N 21/482 | (2011.01) |
| G06F 17/30 | (2006.01) |
| H04N 21/458 | (2011.01) |
| H04N 21/466 | (2011.01) |
| H04N 21/442 | (2011.01) |

(52) U.S. Cl.
CPC ..... *H04N 21/4826* (2013.01); *G06F 17/3082* (2013.01); *H04N 21/44222* (2013.01); *H04N 21/4583* (2013.01); *H04N 21/4667* (2013.01); *H04N 21/4668* (2013.01)

(58) Field of Classification Search
None
See application file for complete search history.

(56) References Cited

U.S. PATENT DOCUMENTS

| 5,369,440 A | 11/1994 | Sussman |
| 6,161,176 A | 12/2000 | Hunter et al. |
| 6,766,526 B1 | 7/2004 | Ellis |
| 7,227,583 B2 | 6/2007 | Sin |
| 7,487,523 B1 | 2/2009 | Hendricks |
| 7,624,920 B2 | 12/2009 | Kromann et al. |
| 7,647,612 B1 | 1/2010 | Stark |
| 7,734,680 B1 | 6/2010 | Kurapati et al. |
| 7,957,381 B2 | 6/2011 | Clermidy et al. |
| 8,132,202 B2 | 3/2012 | Swix et al. |
| 8,150,035 B2 | 4/2012 | McClenny et al. |

(Continued)

FOREIGN PATENT DOCUMENTS

| EP | 1089201 A1 | 4/2001 |
| WO | 0150739 A1 | 7/2001 |
| WO | 2009113040 A2 | 9/2009 |

OTHER PUBLICATIONS

"How to Seta DirecTV Reciever [sic] to Change Channels Automatically." Viewed online Jan. 18, 2013, at http://www.ehow.com/how_4548864_set-directv-reciever-change-channels.html. 3 pages. eHOW.com.

(Continued)

*Primary Examiner* — Nicholas T Corbo
(74) *Attorney, Agent, or Firm* — Coats & Bennett, PLLC

(57) ABSTRACT

Methods and systems for toggling between media content that is provided from a content service provider and displayed on a display. The systems and methods prospectively determine a variety of content that may be of interest to the user and that will air at some point in the future. This includes different content that will be available at the same time. The systems and methods also determine toggle types and toggle triggers for the content. The occurrence of a toggle trigger while first content is being displayed results in switching the display to a different second content. The prospective content and associated toggle types and triggers are determined based on gathered information about the user.

14 Claims, 13 Drawing Sheets

| Toggle Option | Start DateTime | Duration | Shows | Toggle Type(s) | Toggle Trigger |
|---|---|---|---|---|---|
| 60 | 61 | 62 | 63 | 64 | 65 |
| 1 | Mon., 12.15.2015 at 7:30 pm | 240 | Soccer: Eagles vs. Pelicans | Commercial | 5, 6 |
| | | | News: CNN News | Time Interval | 7 |
| | | | Movie: Jaws | Commercial or Vocal Cue | 12, 13, 16 |

(56) References Cited

U.S. PATENT DOCUMENTS

| | | | |
|---|---|---|---|
| 8,171,510 B2 | 5/2012 | Kamen et al. | |
| 8,201,196 B2 | 6/2012 | Michael et al. | |
| 8,321,278 B2 | 11/2012 | Haveliwala et al. | |
| 8,782,691 B1 | 7/2014 | Noble et al. | |
| 8,854,555 B2 | 10/2014 | Adderly et al. | |
| 2001/0049826 A1* | 12/2001 | Wilf | H04N 21/84 725/120 |
| 2003/0066077 A1 | 4/2003 | Gutta et al. | |
| 2004/0155986 A1* | 8/2004 | Horita | H04N 5/44 348/731 |
| 2004/0189879 A1 | 9/2004 | Read | |
| 2006/0238656 A1 | 10/2006 | Chen et al. | |
| 2006/0253330 A1 | 11/2006 | Maggio et al. | |
| 2008/0060027 A1 | 3/2008 | Yang | |
| 2008/0256572 A1 | 10/2008 | Chen | |
| 2008/0297669 A1* | 12/2008 | Zalewski | H04N 7/163 348/844 |
| 2009/0064221 A1* | 3/2009 | Stevens | H04N 5/50 725/38 |
| 2009/0193470 A1* | 7/2009 | Huang | H04N 5/44543 725/58 |
| 2010/0002140 A1 | 1/2010 | Zhang et al. | |
| 2010/0031286 A1* | 2/2010 | Gupta | H04N 5/44543 725/38 |
| 2011/0109801 A1 | 5/2011 | Thomas et al. | |
| 2011/0320300 A1 | 12/2011 | Broms et al. | |
| 2012/0150650 A1 | 6/2012 | Zahand | |
| 2012/0204201 A1* | 8/2012 | Cassidy | H04N 21/258 725/10 |
| 2012/0276982 A1 | 11/2012 | Ansari et al. | |
| 2013/0081084 A1* | 3/2013 | Scheer | H04N 21/2408 725/46 |
| 2013/0133002 A1* | 5/2013 | Li | H04N 21/4668 725/38 |
| 2013/0204825 A1 | 8/2013 | Su | |
| 2013/0254811 A1 | 9/2013 | Ali et al. | |
| 2013/0276016 A1 | 10/2013 | Huang et al. | |
| 2014/0204277 A1* | 7/2014 | Adderly | H04N 5/50 348/731 |

OTHER PUBLICATIONS

"Home audio & video forum: Change TV channels automatically?" Online blog posts viewed Jan. 18, 2013, at http://forums.cnet.com/7723-7596_102-182841/change-tv-channels-automatically/. 5 pages.

"How does ReplayTV and Tivo skip ads? how do they know that ads started/ended?" Viewed online Jan. 18, 2013, at http://answers.yahoo.com/question/index?qid=1005120904141. 1 page.

Replaytv Online Support web page. Accessed Dec. 24, 2012, at http://www.digitalnetworksna.com/support/replaytv/default.asp. 2 pages.

Eisenburg, Anne. "Software that Listens for Lies". The New York Times. Article viewed online Dec. 24, 2012 at http://www.nytimes.com/2011/12/04/business/lie-detection-software-parses-the-human-voice.html?_r=0. 3 pages. Original publication Dec. 3, 2011, The New York Times.

* cited by examiner

| Toggle Option | Start DateTime | Duration | Shows | Toggle Type(s) | Toggle Trigger |
|---|---|---|---|---|---|
| 1 | Mon., 12.15.2015 at 7:30 pm | 240 | Soccer: Eagles vs. Pelicans | Commercial | 5, 6 |
| | | | News: CNN News | Time Interval | 7 |
| | | | Movie: Jaws | Commercial or Vocal Cue | 12, 13, 16 |

Figure 10

| Toggle Option 60 | Start DateTime 61 | Duration 62 | Shows 63 | Toggle Type(s) 64 | Toggle Trigger 65 |
|---|---|---|---|---|---|
| 1 | Mon., 12.15.2015 at 7:30 pm | 120 | Soccer: Eagles vs. Pelicans<br><br>News: CNN News | Commercial | 5 |
| 2 | Mon., 12.15.2015 at 7:30 pm | 120 | Soccer: Eagles vs. Pelicans<br><br>News: CNN News | Time Interval | 12 |

Figure 11

SYSTEM AND METHOD TO DETERMINE CONTENT ITEMS AND ASSOCIATED TOGGLE TRIGGERS FOR A VIEWER

BACKGROUND

Viewers of video content are faced with a vast amount of viewable content. Service providers often offer hundreds of different channels that each includes a variety of different content throughout the day. Often times a viewer does not get to see content of interest because they were not aware that it was available to them. It would be helpful for a viewer to be made aware of upcoming content that they may have interest in. The viewer would then be able to determine whether they want to watch the content.

Further, viewers are often faced with the dilemma of wanting to watch multiple different shows simultaneously for various reasons. For example, a television viewer may regularly watch shows that air during the same time. In another example, a viewer may want to watch two sporting events that are televised live at the same time. In instances when there are two conflicting shows, a viewer through a remote control can use the "previous channel" or "back" button to switch back and forth between channels. The viewer is required to manually switch between the shows when flipping back and forth in an attempt to simultaneously watch both shows. However, this methodology is more cumbersome when there are three or more shows of interest. Because a remote control usually does not provide for switching between three shows such as with the "previous channel" input, the user is required to enter the channel number on which the show is being aired each time they want to switch to a different displayed show. In these various embodiments, the user is required to input commands repeatedly as they switch back and forth between the shows of interest.

SUMMARY

The present application is directed to a device and process for toggling between media content that is provided from a content service provider and displayed on a display. The systems and methods prospectively determine a variety of content that may be of interest to the user and that will air at some point in the future. This includes different content that will be available at the same time. The systems and methods also determine toggle types and toggle triggers for the content. The occurrence of a toggle trigger while first content is being displayed results in switching the display to a different second content. The prospective content and associated toggle types and triggers are determined based on gathered information about the user.

One embodiment is directed to a method of displaying shows on a display screen to a user. The method includes gathering data about the user from at least one of a viewing history including previous shows watched by the user, a user profile, and a user social media account. The method includes based on the gathered data, determining a time during a day in which the user watches shows on the display screen, and also determining subject matter interests of the user. The method includes determining a first show and a second show that will occur during the time of day and that include the subject matter interests of the user with the first and second shows scheduled to air on a predetermined date in the future. The method includes based on the gathered data, determining one or more toggle triggers that will cause switching between the first and second shows on the display screen. The method includes on the predetermined date in the future, displaying the first show on the display screen during the time of day. The method includes while the first show is being displayed on the display screen, determining that one of the toggle triggers has occurred. The method includes responsive to determining that one of the toggle triggers has occurred and without input from the user at this time, switching the display screen from displaying the first show to the second show.

Gathering data about the user social media account may include determining key words that occur within the social media account.

Determining the first show and the second show may include determining that buffered data for the first show and the second show include one or more keywords generated from the gathered data.

The method may also include determining the one or more toggle triggers based on just the viewing history of the user. The method may also include determining that the first show has been displayed on the display screen for a predetermined time period and switching the display screen to the second show.

The method may also include displaying on the display screen a listing of the first and second shows and the one or more toggle triggers and receiving an input from the user prior to displaying the first show on the display screen during the time of day.

Another embodiment is directed to a method of displaying shows on a display screen to a user. The method includes gathering data about a user based at least partly on a viewing history of the user that includes time periods and content of previously-viewed shows. The method includes based on the data, determining future viewing time periods and subject matter interests of the user. The method includes for each of the future viewing time periods, determining shows that will be available for viewing that are directed to the subject matter interests of the user. The method includes for each of the future time periods, prioritizing each of the plurality of shows. The method includes based on the data, determining one or more toggle triggers that will cause the user to stop watching the show and switch the display screen for each of the shows. The method includes during the first one of the future time periods, displaying on the display screen a first one of the shows that has the highest priority. The method includes while the first show is being displayed on the display screen determining that one of the toggle triggers has occurred without receiving an input from the user. The method includes responsive to the determining that the toggle has occurred and without additional user input while the first show is being displayed, switching the display screen from displaying the first show to a second one of the shows with a lower priority.

The method may also include gathering the data about the user using at least one of a social media account and a user profile.

The method may also include storing the user profile that includes favorite types of shows of the user, favorite actors of the user, and time periods when the user watches shows.

The method may also include determining different toggle triggers for each of the shows.

The method may also include receiving a selection from the user of the first and second shows and the toggle triggers prior to displaying the first one of the shows on the display screen.

Determining that one of the toggle triggers has occurred may include determining a vocal cue in the second show while the first show is being displayed.

Determining that one of the toggle triggers has occurred may include determining that the first show has been continuously displayed on the display screen for a maximum time period.

Determining that one of the toggle triggers has occurred may include determining a vocal cue in the first show.

The method may also include prioritizing the toggle triggers for each of the shows and switching the display screen from displaying the first show to the second show upon determining the occurrence of a highest priority one of the toggle triggers.

Another embodiment is directed to a method of displaying shows on a display screen to a user. The method includes gathering data about a user based at least partly on a viewing history of the user that includes time periods and content of previously-viewed shows and a user profile that includes information about the user. The method includes determining a plurality of shows that are available for viewing in the future based on the time periods and content of the previously-viewed shows and the user profile. The method includes based on the data, for each of the plurality of shows determining when the user would be expected to switch viewing the show. The method includes determining that a first one of the plurality of shows is available for viewing and displaying the first show on the display screen. The method includes while the first show is being displayed on the display screen and without receiving an input from the user, determining that the user is expected to switch viewing. The method includes responsive to determining that the user is expected to switch viewing, switching the display screen from displaying the first show to a second one of the shows.

Determining that the user is expected to switch viewing and switching the display screen from displaying the first show to the second one of the shows may occur when a vocal cue occurs in the second one of the shows.

Determining that the user is expected to switch viewing and switching the display screen from displaying the first show to the second one of the shows may occur when the first show has been continuously displayed on the display screen for a maximum time period.

Determining that the user is expected to switch viewing and switching the display screen from displaying the first show to the second one of the shows may occur when a vocal cue occurs in the first show.

The various aspects of the various embodiments may be used alone or in any combination, as is desired.

BRIEF DESCRIPTION OF THE DRAWINGS

FIG. 10 is a viewing options schedule page displaying a viewing option for a user.

FIG. 11 is a viewing options schedule page displaying a viewing option for a user.

DETAILED DESCRIPTION

The present application is directed to methods and systems for toggling between media content that is provided from a content service provider and displayed on a display. The systems and methods prospectively determine a variety of content that may be of interest to the user and that will air at some point in the future. This includes different content that will be available at the same time. The systems and methods also determine toggle types and toggle triggers for the content. The occurrence of a toggle trigger while first content is being displayed results in switching the display to a different second content. The prospective content and associated toggle types and triggers are determined based on gathered information about the user.

The media content includes a variety of different types of media that are referred to as "shows". Each of the shows lasts for an extended period of time. The shows may include stored content, such as but not limited to previously recorded programs (e.g., sitcoms, dramas, reality programs, movies), as well as live content such as but not limited to sporting events, live productions, and news programs.

One or more toggle types that cause the displayed show to be changed may be determined by the system. Examples include but are not limited to an elapsed time interval, the occurrence of a commercial on the displayed content, and the occurrence of a predetermined vocal cue on the displayed or buffered content. For the various toggle types, the system further determines a toggle trigger. Examples include but are not limited to an amount of time that a show should continuously appear on the display, vocal words and phrases, and various sounds such as vocal and musical sounds.

The system develops the content and corresponding triggers that may be of interest to the user based on gathered data about the user. The gathered data may be from a user profile, one or more social media accounts, and a viewing history. The content and toggles may be presented to the user for their selection prior to being implemented by the system.

Once implemented, a first show is displayed on the display until a toggle trigger is detected. Once detected, the show on the display is changed to a second show from the developed show options. This process may continue with the detection of another toggle trigger causing another changing of the displayed show. This process may continue with the detection of subsequent toggle triggers causing additional changing of the displayed show.

Figure 1:
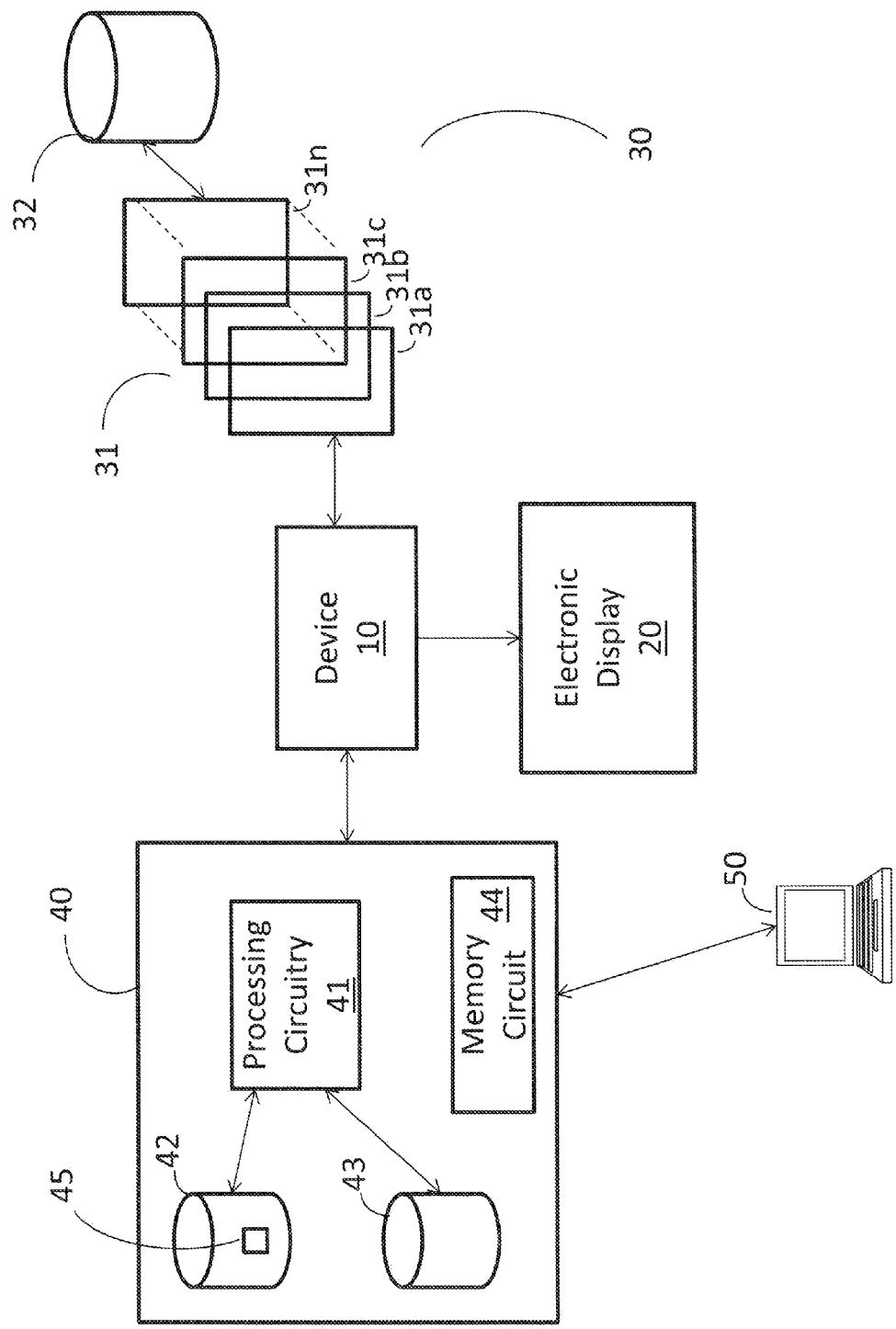
FIG. 1 is a schematic diagram of a content selection system.

FIG. 1 illustrates a device 10 that provides automated content selection for selecting content to display on an electronic display 20 (e.g., a television). The device 10 receives media signals that contain video content from a content service provider 30, and provides the video content in a format that can be displayed on the electronic display 20. Device 10 also receives input from a content selection service provider 40 that determines possible interests for the viewer and corresponding toggles.

The electronic display 20 is used to view the video content provided through the device 10. The display 20 may include various television-type displays (e.g., LCD screen, plasma screen, etc.). Display 20 may also include various other forms, including but not limited to a mobile device (tablet/smart phone), laptop, desktop monitor, exercise equipment (e.g., screen in treadmill or elliptical), wearable technology such as clothing and accessories, and a console in a vehicle.

Figure 2:
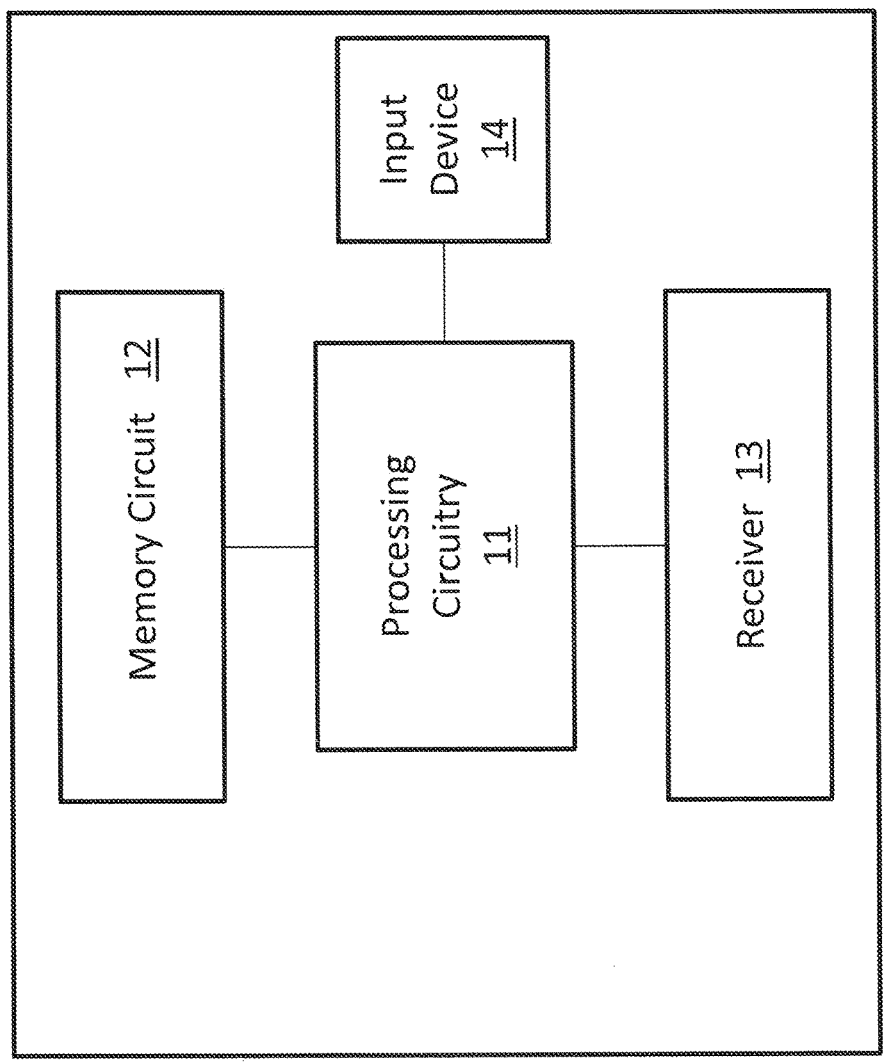
FIG. 2 is a schematic view of a device.

FIG. 2 illustrates a device 10. This device 10, which may be provided by the content service provider 30, is configured to provide video content received from the content service provider 30 to the electronic display 20. In one or more embodiments, the device 10 is a set top box (STB) that is provided by the content service provider 30. The device 10 includes a processing circuitry 11 that controls the overall functioning of the device 10. The processing circuitry 11 includes one or more processing circuits that may include one or more microprocessors, microcontrollers, Application Specific Integrated Circuits (ASICs), or the like, configured with appropriate software and/or firmware. The processing circuitry 11 may be configured to execute program code stored in memory circuit 12 to implement the techniques discussed below.

Memory circuit 12 is associated with the processing circuitry 11 and stores settings and associated criteria for toggling between the shows. Memory circuit 12 includes a computer readable storage medium that stores the settings/criteria data and also stores computer readable program code that configures the processing circuits to implement the various techniques described herein. The memory circuit 12 may include various types of memory 12, such as random access memory, read-only memory, and flash memory, for example. The memory 12 may be only associated with the processing circuitry 11, or may be shared by one or more of the other components.

A receiver 13 receives the media signals from the content service provider 30 that contain video content. Receiver 13 may further include processing capabilities for processing (e.g., decoding) the media signals to obtain the video content. Alternatively, the processing may be performed by the processing circuitry 11. Receiver 13 is further configured to receive input from the content selection service provider 40 (e.g., settings and associated criteria for toggling between shows). The processing of the input from the content selection service provider 40 may be performed by the receiver 13, the processing circuit 11, or both. The device 10 may also include two separate receivers (e.g., a first receiver configured for the content service provider 30 and a second receiver configured for the content selection service provider 40).

The receiver 13 may also be configured to receive input from the user, such as through a remote control device. This may include a wired connection through an input port, or may include an infrared receiver configured to receive infrared signals from an infrared remote control device. This functionality may be performed by the same receiver 13, or may be performed in a separate receiver.

The device 10 may also be equipped with various different types of user inputs 14, such as but not limited to a keypad, input buttons, joystick, and touch screen display to receive inputs from the user.

At least one of the processing circuitry 11 and receiver 13 of the device 10 can detect a commercial on the current channel or one of the possible upcoming channels through various software programs. The device 10 may be configured to analyze the channel information from the incoming signals looking for fades to black and changes in closed captioning data. One example of a system that detects for commercials includes ReplayTV. At least one of the processing circuitry 11 and receiver 13 may also be configured to detect the occurrence of specific words, phrases, or sounds. One or both of the processing circuitry 11 and receiver 13 can determine vocal cues of other, non-displayed shows. For example, keywords such as particular places (e.g., Bermuda) or characters (e.g., Scooby Doo) can be determined from the content of the non-displayed shows.

The video content received from content service provider 30 could include television broadcasts, or could include Internet content. If the content includes television broadcasts, the device 10 may act as a set top box that decodes signals broadcast from content service provider 30 to obtain shows that are viewable on the electronic display 20. The device 10 may also provide a user interface that may be overlaid on that video content or displayed separately (e.g., a channel guide, and interface for ordering "on-demand" content, etc.).

Figure 3:
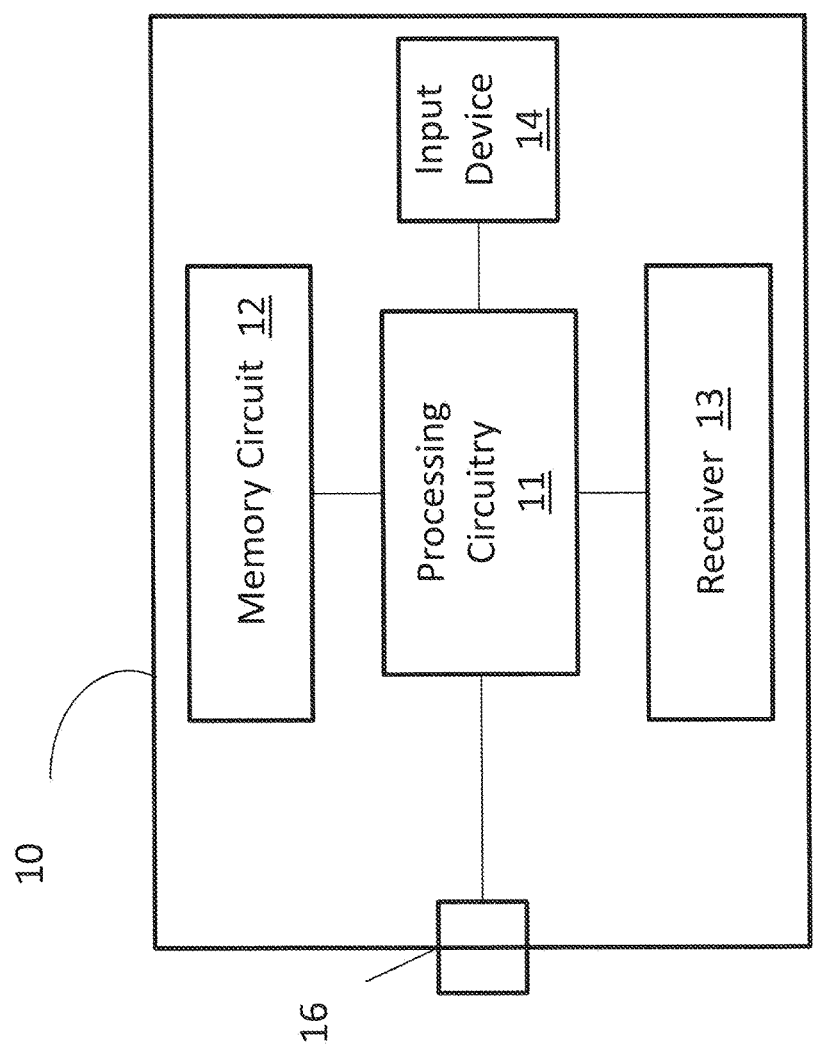
FIG. 3 is a schematic view of a device having an input port for receiving a CableCARD.

In one or more embodiments the device 10 is provided by the content service provider 30 and may be configured to only be compatible with the content service provider 30, and not other content service providers. In other embodiments, the device 10 is provided by a third party and is compatible with multiple content service providers 30. This compatibility could be offered by the device 10 having an input port 16 for receiving a CableCARD from a given content service provider 30 that configures the device 10 with the necessary settings for decoding broadcast signals from the given content service provider 30 (see FIG. 3). In the CableCARD embodiment of FIG. 3, the device 10 could be a set top box, or a computing device such as a desktop computer, for example.

Figure 4:
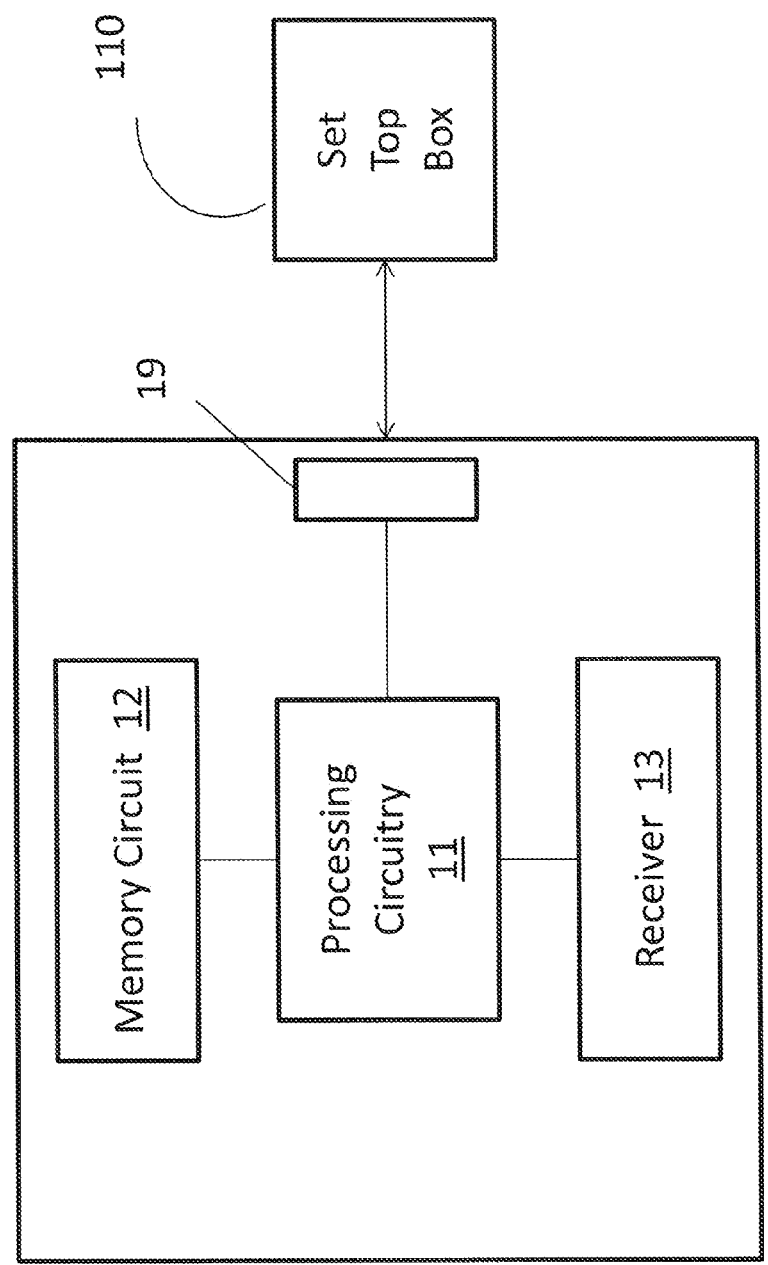
FIG. 4 is a schematic view of a device that is separate from a set top box configured for a given content service provider.

In another embodiment, shown in FIG. 4, the device 10 is separate from a set top box 110 configured for a given content service provider 30. In such embodiments, the set top box 110 would obtain video content from content service provider 30, and the device 10 would be separate from the set top box 110 and would be configured to control the set top box 110 to perform show selection via a control interface 19, which could be a wired interface, or a wireless interface (e.g., infrared, or radio frequency).

Referring again to FIG. 1, the content service provider 30 sends media signals to the device 10. The content service provider 30 includes one or more content servers 31a, 31b, 31c . . . 31n (referred to as a whole as content servers 31). The content service provider 30 may provide its media signals by operating as one or more of a cable provider, a satellite provider, broadcast television provider, and a data packet-based computer network (such as an Ethernet network). The content service provider 30 transmits the content as media signals that are received by the device 10. The term "media signals" should be broadly considered to include audio and/or video content, pictures, animations, text, etc.

The content from the content service provider 30 includes a variety of different types of media (e.g., video segments) that are referred to as "shows" that extend for a period of time. The shows may include stored content, such as but not limited to previously recorded programs (e.g., sitcoms, dramas, reality programs, movies), as well as live content such as but not limited to sporting events, live events, and news programs.

Each of the shows has associated information that may include various details such as but not limited to a description of the show, keywords about the show, the names of the persons involved with the show (e.g., actors, directors), and location of the show. The information may also include information about the offering relative to the service provider, such as the channel on which the show is aired, time of airing, and length of the show. This information is stored in a content description database 32. The content service provider 30 develops a schedule that extends into the future and describes a schedule of upcoming shows that will be available on each of the channels. The information about each of the shows is associated with the shows on the schedule to allow a user to determine future viewing options.

The content selection service provider 40 is configured to store and analyze data to develop show and toggle recommendations to the user. The content selection service provider 40 includes processing circuitry 41 that may include one or more microprocessors, microcontrollers, Application Specific Integrated Circuits (ASICs), or the like, configured with appropriate software and/or firmware. The processing circuitry 41 is configured to determine viewing options for the user.

The content selection service provider 40 also includes a memory circuit 44 which includes a computer readable storage medium that stores data and computer readable program code that configures the processing circuitry 41 to implement the various techniques described herein. The memory circuit 44 may include various memory devices such as random access memory, read-only memory, and flash memory, for example.

The content selection service provider 40 also includes one or more databases 42, 43 that are stored in a non-transitory computer readable storage medium (e.g., an electronic, magnetic, optical, electromagnetic, or semiconductor system-based storage device). The databases may be local or remote relative to the content selection service provider 40.

A user profile 45 is stored in one of the databases 42, 43 (FIG. 1 includes storage in the first database 42). The user profile 45 includes information that the user enters at the time of establishing the service, or may later update as necessary. The content selection service provider 40 may include a web interface for accessing the profile 45. The web interface may support a website through which the user profile 45 is accessible. In one or more embodiments the web interface provides browser-based access to the contents of the database. The user may login to the browser-based interface through different devices 50 and access their profile 45. The user profile 45 may also be executed as a standalone dedicated application (e.g., an Android or iOS application) that may be installed and used on various devices (e.g., mobile device).

The display 20 is used to view the content provided through the device 10. The display 20 may include various television-type displays (e.g., LCD screen, plasma screen, etc.). Display 20 may also include various other forms, including but not limited to a mobile device (tablet/smart phone), laptop, desktop monitor, exercise equipment (e.g., screen in treadmill or elliptical), wearable technology such as clothing and accessories, and a console in a vehicle.

Figure 5:
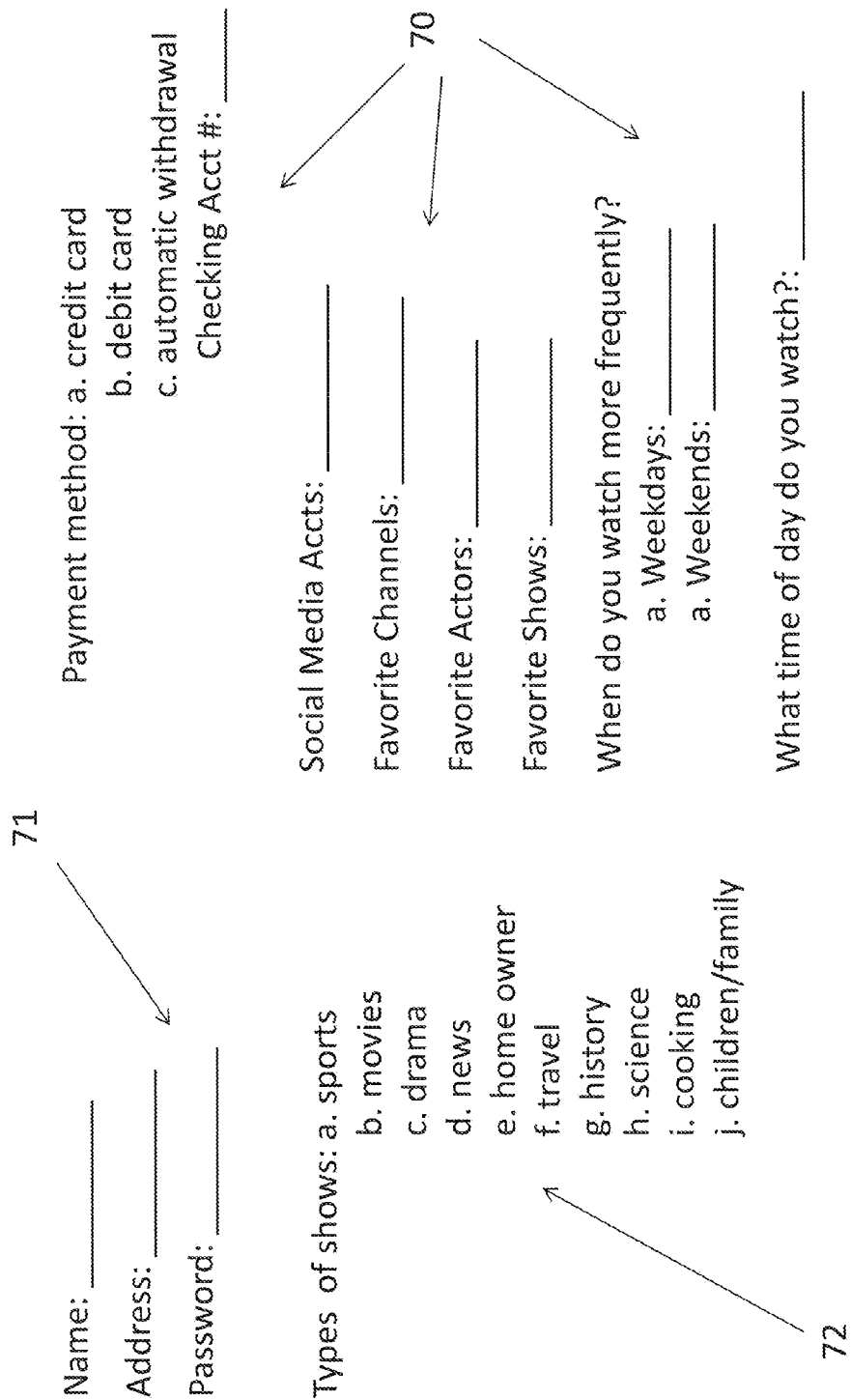
FIG. 5 is an enrollment input screen for receiving information about the user.

The user profile 45 is initially established by the viewer at the time of enrollment with the system. The profile 45 provides the system with both procedural information and subject matter information. FIG. 5 includes an enrollment screen 70 that is provided to the user. A first portion 71 of the screen requests information necessary for procedurally starting the account. This information includes user's name, address, and password associated with the account. This information may also include the manner in which the user will make payments for these services. In one embodiment in which the device 10 is provided by the content service provider 30, a monthly fee for the service may be automatically added to the user's monthly invoice.

The enrollment screen 70 also includes a second portion 72 directed to the subject matter interests of the user. The system may prompt the user to input their favorite types of shows, favorite channels, favorite actors, and any particular favorite shows. The user may also be prompted for favorite viewing days and times. Because a viewer's schedule is often different on weekdays and weekends, the user may be prompted for the viewing times for specific days of the week or specific times for weekdays and specific times for weekends.

The enrollment screen 70 may provide possible selections for one or more of the various input selections. For example, the screen 70 may include a listing of favorite types of shows and require the user to select one or more that are applicable. One or more of the selections may also include the user entering the information without possible options being displayed.

The user initially completes the enrollment process at the time of enrollment. The user is also able to update/change their profile at a later date. The changes may include a change to procedural information, for example if the user wants to change the manner in which payments are made for the services. The changes may also include subject matter interests. Examples include different days and times for favorite viewing, new favorite channels, or newly-discovered actors of interest.

The screen 70 may also include an option for inputting one or more social media accounts of the user. Examples include but are not limited to FACEBOOK, TWITTER, and LINKEDIN. The user is further required to input relevant information (e.g., username and password) to allow the system access to these accounts for further developing their profile.

The social media accounts provide an additional resource for determining interests of the user. These accounts may include both interests that are trending for the user as well as established baseline or core interests of the user. The system may analyze the accounts in a number of different manners. One manner includes a word count for the number of times that particular words are used. This may also include tracking where the words appear within the various messages, such as whether the words appear in a heading or whether the words appear in the body of a message or post. Another example of tracking social media accounts includes feeds/lists provided by hashtags (#) for a TWITTER account.

A third area of information tracked by the system in developing the viewing options is the viewing history of the user. The viewing history accumulates over time and is not available at the time of enrollment. The system may include the viewing history of the user within a predetermined time period (e.g., last month, last three months, last year), or may accumulate the information since the time of enrollment.

When considering viewing data that occurs over an extended period, the system may place more weight on the more-recent data. For example, data from the last month may be weighted more heavily than data from more than six months ago. The various time windows and corresponding weighting may vary.

The viewing history that accumulates for the user may include procedural aspects, subject matter aspects, and toggle aspects about the user.

The procedural aspects about the user provide a first type of information to the system in developing viewing options. These aspects include viewing dates and may further include days of the week for the viewed shows. This may also include the viewing times (e.g., 7:00 am-9:00 am, 8:30 pm-10:00 pm), the various viewed channels, and the duration of each viewing. This may also include the month of viewing.

The subject matter aspects include information from the service provider that is associated with the viewed shows. This is the information associated with the shows that is stored within the content description database 32. For shows that are viewed by the user, the information may include the type of show (e.g., sports, news, drama, movies), name of the show, actors in the show, and a description including keywords about the show.

Toggle aspects include information about the system that was occurring at the time the user changed from a first show that was being viewed to a new second show: information that was occurring at 12:30 pm when the user changed from a first show of a football game to a second show of a history documentary, for example. This information may include information about the first show, such as the total time that the user was watching the first show, the time of day, and whether a commercial was airing on the first show at the time of switching. This information may also include the words/phrases/sounds in the show a predetermined time period before the switch: for example the words/phrases/sounds for a five second period before the switch, or a three second period before the switch. The information may also include information about the second show that was switched to at the time of the switch, such as the channel, the show, and keywords about the show.

Based on the gathered information, the system develops a viewing options schedule for the user that includes time, show, and toggle options. The schedule is based on the information from one or more of the user profile, social media accounts, and viewing history. The viewing options schedule is forward-looking to suggest options for the viewer for shows that will occur in the future. The schedule informs the user about upcoming shows that may be of interest to prevent the user from missing the shows. The toggle options included with the schedule correspond to the interests of the user to switch shows to further maximize the user's viewing.

The future shows included in the schedule are selected based on the upcoming show schedule that is provided by the content service provider 30. The schedule includes the dates and times of the upcoming shows, the channels on which the shows are available, as well as subject matter information about the show as described above (name of show, keywords, etc.).

Figure 6:
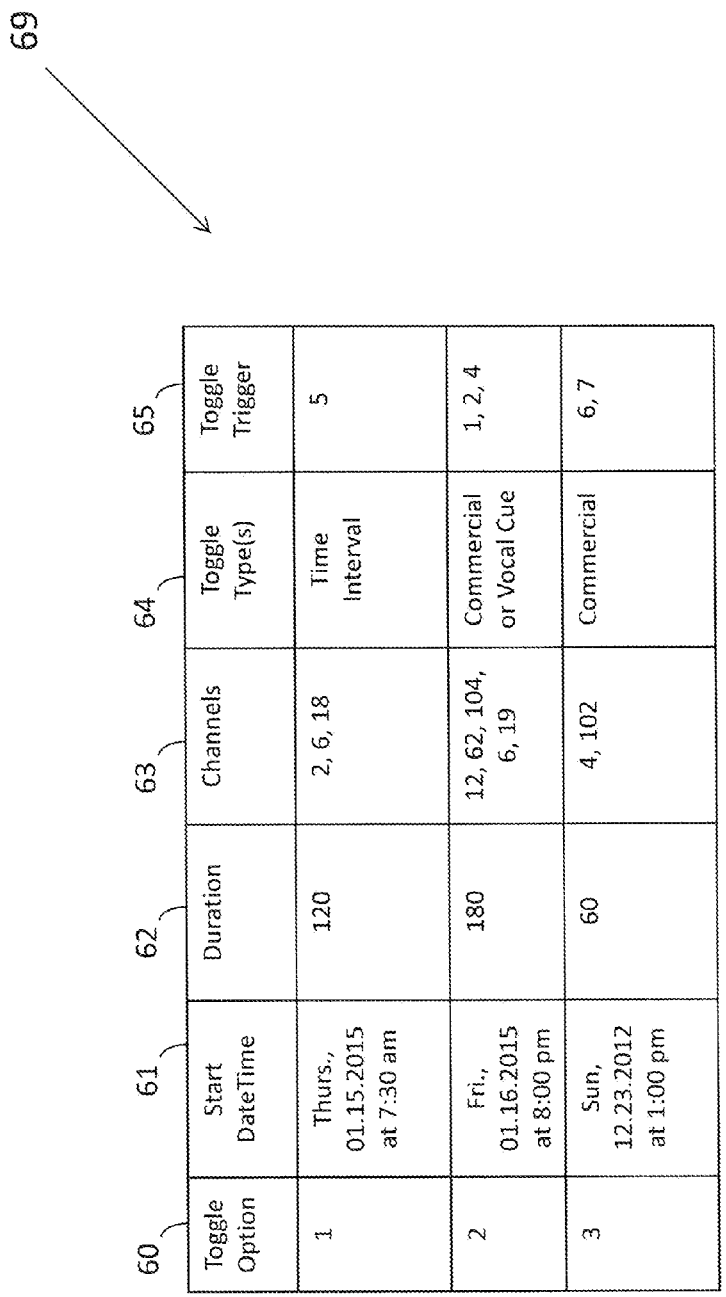
FIG. 6 is a viewing options schedule page displaying various viewing options for the user.

The viewing options schedule provides one or more options that may be selected by the user. FIG. 6 illustrates an example of a schedule 69 with different viewing options 60 that may be selected by the user. The viewing options 60 include a start date and time 61, duration 62 in minutes, content 63, toggle type 64, and toggle trigger 65. In this embodiment, each viewing option 60 includes multiple channels 63 that will be toggled through for the duration of the option. These channels 63 are listed in priority with the highest priority channel listed first, the second highest priority channel second, etc.

Figure 7:
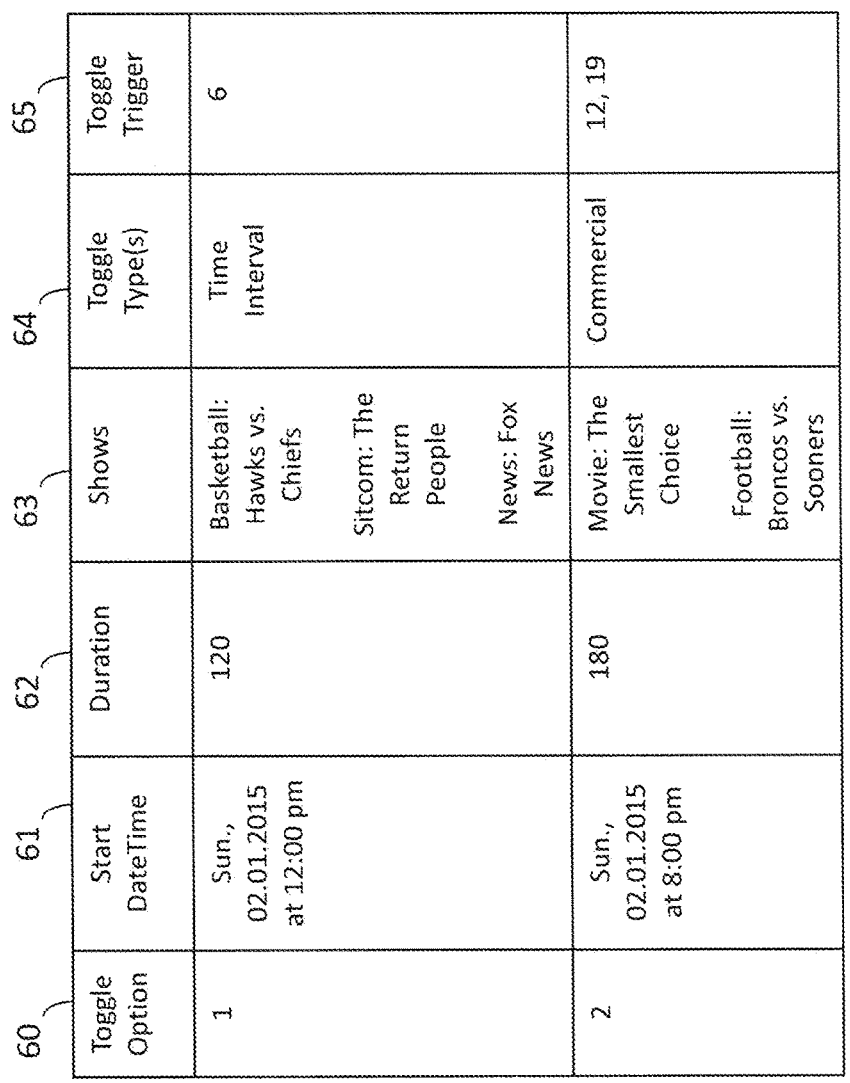
FIG. 7 is a viewing options schedule page displaying various viewing options for the user.

FIG. 7 illustrates a similar viewing options schedule 69. This schedule 69 includes the content 63 being more specific shows. This more specific information about the content may be based on the system having additional information from the user providing for a more detailed options schedule.

The information displayed to the user may include various levels of detail. For example, the content 63 may include just the channel numbers, the names of the channels, or both. Content 63 may also include the titles of the specific shows, a brief description about the shows, or both. This more specific information may be associated with the content and retrieved from the content description database 32. Further, the toggle triggers 65 may be displayed in varying detail. This may include a number, letter, symbol, etc. indicating a specific trigger. The triggers 65 may also be described in more detail, such as "15 minutes" or "30 minutes" for time interval durations, or "we'll be right back", "after these words from our sponsors" for vocal cues.

The toggle triggers 65 may also include vocal cues that occur during the other non-displayed shows 63 that could cause a change in the displayed content. For example, the phrase "Taylor Swift" that occurs in a vocal cue on another one of listed shows 63 may cause the device 10 to change to that show. This may be caused by the user indicating in their profile that Taylor Swift is their favorite performer, or by frequent social media inputs indicating their interest in Taylor Swift content. The vocal cues from the other listed shows 63 are buffered by the device 10 thus allowing the display 20 to be changed upon the occurrence of the indicated keywords. Certain keywords in buffered content may be included as toggle triggers 65 for each user option 60 regardless of the time or day. Other keywords may only be included for specific options 60. For example, the user may have an interest in Taylor Swift during any viewing time. However, they may only have an interest in weather-related closings and delays just during a morning viewing period, such as 6:00 am-7:00 am when the user watches content prior to going to work.

The content 63 is further listed in order of priority according to the gathered data. In use, the device 10 initially displays the content with the highest priority. Once a toggle trigger 65 with the associated toggle type 64 occurs, the device 10 switches to display the content with the next highest priority. The device 10 may be configured to progress through each content item being displayed. Once each content item has been displayed, the device 10 may start again with the highest priority show being displayed. Alternatively, the device 10 may stop the toggle process and continuously display one of the content items (e.g., the highest priority content). The device 10 may also be configured to switch to the highest priority content item that is not currently being displayed. For example, assume channel 1 is the highest priority, channel 2 is the second highest priority, and channel 3 is the third highest priority. If the device 10 is currently displaying channel 2 and a commercial is detected, the device 10 will attempt to change to channel 1 (i.e., the highest priority channel on the list). In the event channel 1 is also airing a commercial, then the device 10 will attempt to change to channel 3 (i.e., the third priority channel). Further, the toggle types 64 may be listed in order of priority.

Figure 8:
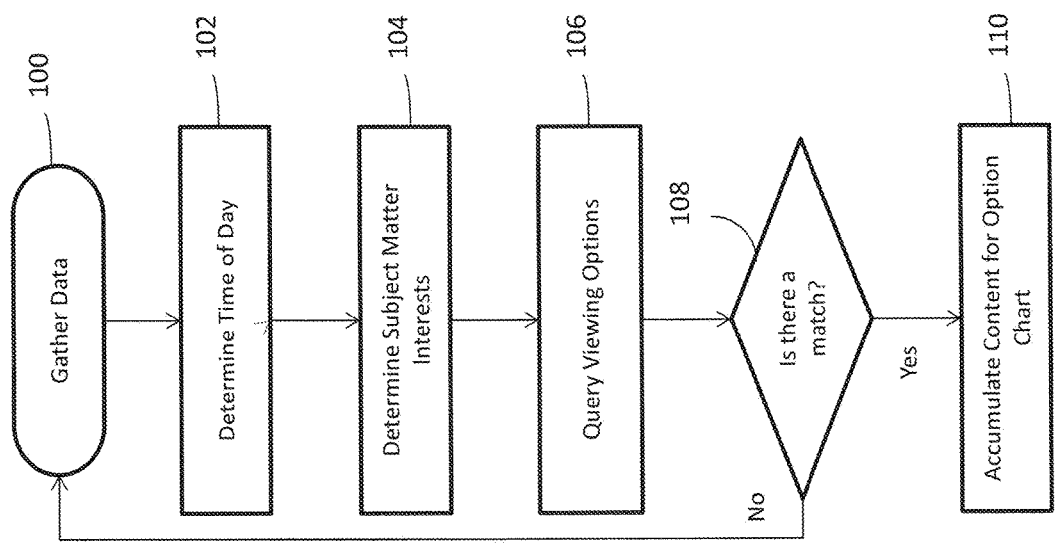
FIG. 8 is a flowchart diagram of a method of gathering data about a user for creating viewing options.

FIG. 8 illustrates one method of developing viewing options for the user. This method is based on gathering data for the user over a period of time in which the viewing history is recorded. The method includes gathering data about the user including their viewing history, profile, and information from one or more social media accounts (block 100). The method also includes determining one or more time periods that are applicable to the user (block 102). This is based mainly on viewing history, although it may also include factoring information from the user's profile or information acquired through their social media links. In one embodiment, the method includes using the various times in which the user posts messages to their social media accounts as an indicator of availability for viewing shows (i.e., this time period indicates the user is not working or otherwise busy with other activities). This is especially true when the content posted on the social media account references a specific show (e.g., reference to the upcoming Super Bowl).

The method further includes determining subject matter interests of the user (block 104). This may initially include general topics, such as sports, news, history, movies, etc. This information may be based on their profile, and may also be based on viewing history. This level of information may provide for general channels to be recommended. If additional information about the user is available, more specific recommendations may be provided to the user. For example, if it is determined that auto racing is an interest, more specific channels or specific shows on the various channels may be recommended. Additional information about the user may further refine the query resulting in more specific shows, such as Formula One racing. Although FIG. 8 includes determining the time of day prior to determining subject matter interests, these may also be performed in the opposite order.

Once the time periods and subject matter are determined, the method includes querying the upcoming show data from the content service provider 30 to determine if there are any matches (block 106). If there is a match (block 108), the selected content is indicated (block 110). If there is no match, additional data is gathered and additional upcoming shows are reviewed.

Figure 9:
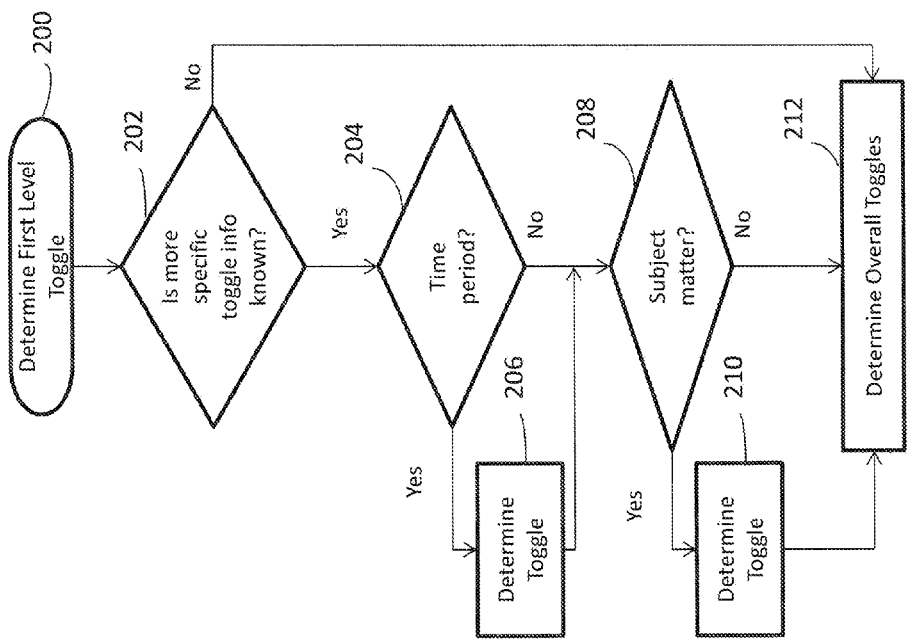
FIG. 9 is a flowchart diagram of a method of determining toggles for the content items of a user.

FIG. 9 indicates how one or more toggle triggers are associated with the selected content. A first level toggle may be initially assigned to the content (block 200). This may be a default setting, such as a toggle occurring when a commercial airs, or after a predetermined period of time. The method then includes determining whether additional information is available to assign a more specific toggle to the content (block 202). This is based on additional information that is based on the gathered data that may include one or more of the viewing history, social media accounts, and the user's profile.

This more detailed information may provide a determination that a more specific time period toggle is applicable (block 204). If a time period toggle option is applicable, the updated toggle is included with the options (block 206). For example, the first toggle is a time duration toggle of 60 minutes. However, if the viewing history of the user demonstrates that the user changes shows during this time period every 30 minutes, this difference will be accounted for.

Likewise, it may be determined that a more accurate toggle is available for the subject matter of the content (block 208). If so, an updated toggle is determined (block 210): for example if the default toggle includes a change upon the occurrence of a commercial on the displayed show. However, for the specific content (e.g., football game), the user's viewing history indicates that the user does not change shows. Therefore, this information will be analyzed to determine the appropriate toggle.

The method includes gathering the one or more toggle inputs and then assigning one or more toggles to the content (block 212). When two or more toggle types are recommended, the toggles are prioritized. For example, if it is determined from the viewing history that a user switched from a show six times upon the occurrence of a commercial and overall switched shows about every 15 minutes on average during a 90 minute viewing period, then the method includes recommending a commercial toggle type as a first priority and time interval of 15 minutes as a second priority toggle type. Therefore, if a commercial aired before 15 minutes elapsed while viewing a show, then the next highest priority channel not airing a commercial will be switched to.

Different toggle types may also be assigned to different shows that occur for a particular option. Using FIG. 10, the viewing option 60 is for 7:30 pm on December 15. The content includes three shows 63 that occur during this time: a soccer game, CNN news, and the movie Jaws. During the development of these content options, a generic time duration toggle trigger (e.g., 30 minutes) is assigned to each of the shows. However, based on the user's viewing history, it is determined that the user will watch a soccer game for an extended period of time. It is also determined that the user will change the soccer game during a commercial. Therefore, the soccer match option includes a first toggle type. The second option includes CNN News. The system may not have accumulated additional information about this type of content. Therefore, the system will leave the default duration option of 30 minutes. The last option is the movie Jaws. From the user's social media account, the system determines that this is the user's favorite movie. Therefore, the toggle trigger will be changed to the applicable toggle.

The same content may be listed in two different options as illustrated in FIG. 11. Each of the options 60 includes the same start time and date, duration, and shows. The first option includes a first toggle type and trigger and the second option includes a second toggle type and trigger. The user may select the desired option depending upon the toggle settings.

The user may also be able to edit the various options that are presented. For example, the user may select an option, but change the order of priority of the content and/or toggle type and/or toggle trigger.

Once one or more of the viewing options are determined, the information is presented to the user for their approval. The user may be notified/presented with the schedule in various manners. One manner is by providing a table of options (e.g., FIGS. 6, 7, 10, 11) upon logging into system. The schedule may also be sent to the user via electronic mail or SMS/MMS message. A pop-up/scroll may be included on the display 20 while the user is watching a show. The schedule may also be sent to the user through a social media post.

Once the user has selected one or more options, the device 10 will switch to the toggling process at the inputted start time. This may occur only in the event that the device 10 is active, which may include that the display 20 is currently on. In one embodiment when the display 20 is on at the time one of the toggling option starts, the device 10 may provide an indication to the user that the toggling option has started. This may include one or more of a message that appears on the display 20, a device display 14, or other like manner.

In one embodiment when the display 20 is on at the start of a toggle option, the device 10 may change the display 20 from the current content that is being displayed to the first content item listed in the toggling option. By way of example, if the user is currently watching channel 3 at the time the toggle option starts, the device 10 automatically switches the channel to channel 5 which is the first channel indicated for the particular option. In another embodiment, the device 10 may prompt the user whether to change the channel at the start of the toggling option prior to changing the displayed channel.

Figure 12:
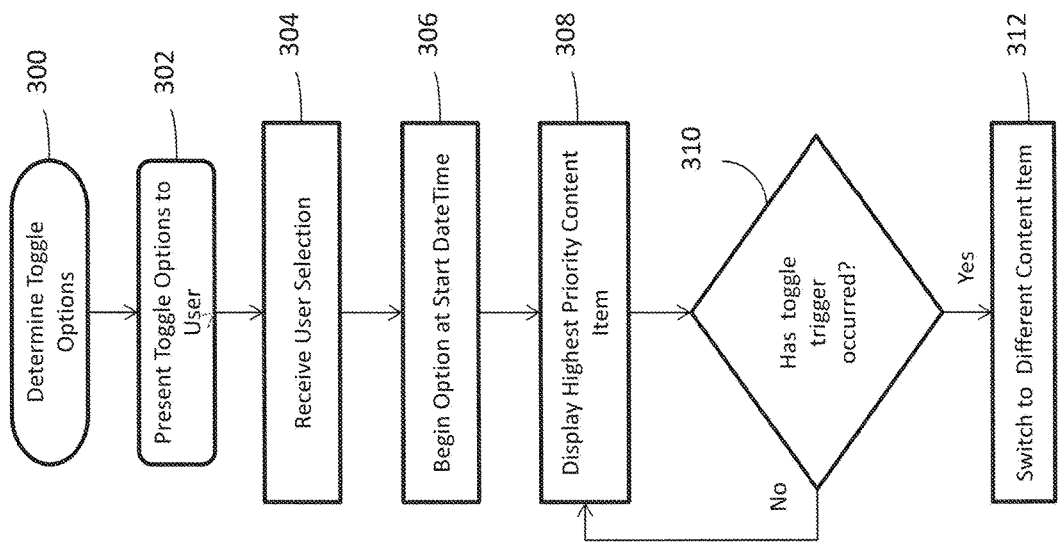
FIG. 12 is a flowchart diagram of a method of receiving a selection from a user and displaying content items on a display.

FIG. 12 illustrates a toggle process that determines one or more toggle options for the user (block 300). The options are presented to the user (block 302) and a user selection is received (block 304) selecting one or more of the options. The toggle option at the indicated start date and time is started (block 306). If the user is already watching content at the time, a message may be displayed indicating the selected toggle option and then switch the display 20 to the highest priority content item (block 308). The user may also be prompted to confirm that the display 20 is to be changed prior to switching to the highest priority content item (block 308). The highest priority content item is displayed until a toggle trigger occurs (block 310). The display is then changed to the next highest priority content item (block 312). This process may continue for the selected duration with a change in the content item upon each occurrence of a toggle trigger. This process may include each of the content items being displayed until the next toggle trigger. Once each content item has been displayed, the method may include starting again with the highest priority channel being displayed. Alternatively, the method may include stopping the toggle process after each of the content items has been displayed and then continuously displaying one of the content items (e.g., the highest priority content item).

Another example of the method of FIG. 12 includes displaying the show with the highest priority (block 308). While the show is being displayed, it is determining that a vocal cue has occurred on one of the non-displayed shows (block 310). This may include the occurrence of a particular keyword. This causes the display to be switched to that show with the vocal cue (block 312).

Figure 13:
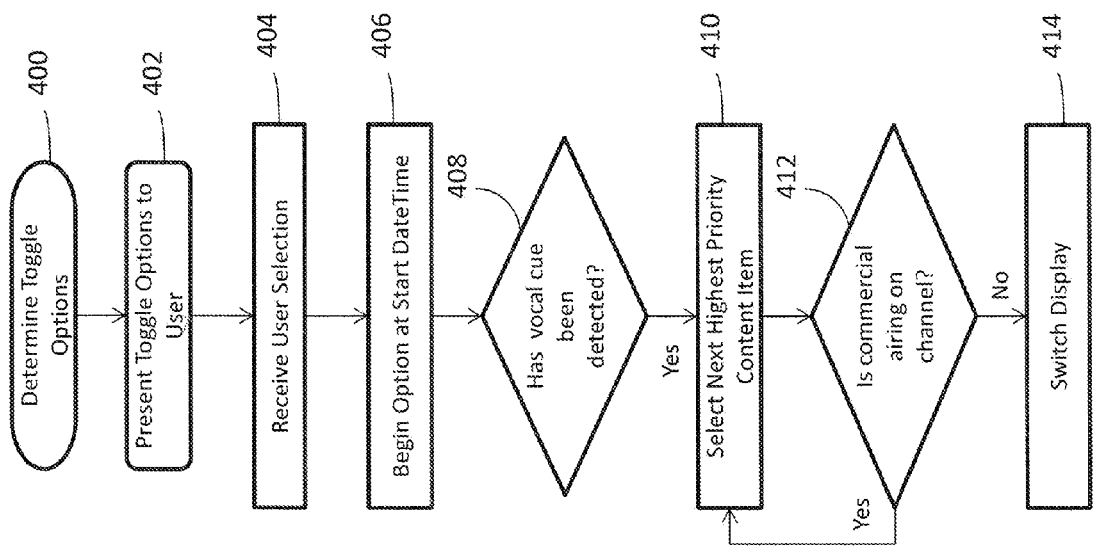
FIG. 13 is a flowchart diagram of a method of receiving a selection from a user and displaying content items on a display.

The system may also be configured to prevent switching the display 20 to a channel that is airing a commercial if the user has indicated a commercial toggle type. FIG. 13 includes one such method. The initial steps of the method (blocks 400-406) are the same as FIG. 12. After the system begins the toggle option with the highest priority show being displayed, the method includes determining whether a vocal cue indicating a commercial is about to be aired has occurred on the displayed show (block 408). If the vocal cue is detected, the next highest priority show is selected (block 410). If a commercial is not detected on this show (block 412), then the display 20 is switched to this next highest priority show (block 414). If the channel on which this content item is also airing a commercial (which is detected by buffering the content), it is determined whether a commercial is being aired on the channel with the next highest priority. This continues through the content item list until finding a content item that is being aired. The display 20 is switched to that content item. If each of the channels of the content items in the list is airing a commercial, the method may include continuing to display the current content item. Alternatively, the method may include displaying the channel with the highest priority content item.

In the various embodiments, the toggles may cause switching of the shows at various times. This may include switching from a first show to a second show prior to a commercial being displayed on the display screen 20. For example, the device 10 may determine the occurrence of a particular vocal cue (e.g., "we'll be right back after these messages") and change to the second show prior to the upcoming commercial being displayed on the screen 20. Thus, the user does not view any of a commercial. Likewise, because the content is buffered, a show of interest may be detected on another show and switched to that show prior to the vocal cue occurring on the displayed content. For example, the buffered data may indicate that an upcoming segment about Taylor Swift is about to be aired on a currently non-displayed show. The device 10 may change to this show prior to the start of the segment. Thus, the user does not miss any of a particular show.

In one embodiment, the shows 63 on the selected option are buffered during the duration of the option. Upon the occurrence of determining a vocal cue on one of the shows that is not being displayed, the display is switched to that show. Instead of displaying from the time of the switch, the buffered portion of the show is displayed so the user can view the show when the vocal cue occurs. The amount of time the show is displayed prior to the occurrence of the vocal cue may vary (e.g., 3 seconds, 5 seconds, 1 minute). In one embodiment, the show is displayed from a start of a segment, such as from the occurrence of the last commercial.

One specific embodiment of this concept is a user who is currently watching a football game. A reference to Taylor Swift occurs on one of the other shows that is included in the viewing option. At the time of detection, the display is switched to the buffered portion of the show that occurred prior to the Taylor Swift reference being displayed. The switch to the new channel provides for the user to watch the show when the phrase "Taylor Swift" occurs. Further, displaying the portion of the show prior to the reference provides for the user to get the context in which the phrase "Taylor Swift" was mentioned.

Toggling between different channels based on one or more selected toggle types and toggle triggers is disclosed in U.S. Pat. No. 8,854,555 which is thereby incorporated by reference in its entirety.

The toggling process continues throughout the duration of the toggle option with the various content items being displayed at one or more times. At the end of the duration, the toggling process ends. In one embodiment, the content item that is currently being displayed at the time the process ends will continue to be displayed. The system may further display a message on the display or otherwise notify the user that the toggle process has terminated.

The various shows and toggle options are developed by the system based on the gathered data. The user may also be able to specifically select one or more shows or toggles for the system. For example, the system may determine that the time period from 8:00 pm-9:00 pm is of interest to the user and develop a schedule with a list of shows and toggles based on the gathered data. When the information is presented the user, the user may be able to also select one or more shows and/or toggles for this time period. For example, the user may select their favorite show that airs during this time period. Likewise, the user may select a particular toggle.

The various methods may be performed by one or more of the device 10, the content selection service provider 40, and the content service provider 30.

Terms such as "first", "second", and the like, are also used to describe various elements, regions, sections, etc. and are also not intended to be limiting. Like terms refer to like elements throughout the description.

As used herein, the terms "having", "containing", "including", "comprising" and the like are open ended terms that indicate the presence of stated elements or features, but do not preclude additional elements or features. The articles "a", "an" and "the" are intended to include the plural as well as the singular, unless the context clearly indicates otherwise.

The present invention may be carried out in other specific ways than those herein set forth without departing from the scope and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A method of displaying shows on a display screen to a user, the method comprising:
gathering data about the user from at least one of a viewing history, including previous shows watched by the user, a user profile, and a user social media account;
based on the gathered data, determining a time during a day in which the user watches shows on the display screen, and also determining subject matter interests of the user;
determining a first show and a second show that will occur during the time of day and that include the subject matter interests of the user, the first and second shows scheduled to air on a predetermined date in the future;
based on the gathered data from at least one of the viewing history, the previous shows watched by the user, the user profile, and the user social media account determining different first level toggle triggers for each of the first and second shows, the toggle triggers being real time events that happen while the shows are occurring and that are outside the control of the user and that will cause switching between the first and second shows on the display screen;
determining that additional information is available about the user and determining one or more more specific second level toggle triggers based on the additional information that includes at least one of the viewing history, the previous shows watched by the user, the user profile, and the user social media account;
on the predetermined date in the future, displaying the first show on the display screen during the time of day;
while the first show is being displayed on the display screen, determining that one of the second level toggle triggers has occurred that is associated with the first show; and
responsive to determining that one of the second level toggle triggers has occurred and without input from the user at this time, switching the display screen from displaying the first show to the second show.

2. The method of claim 1, wherein gathering data about the user social media account comprises determining key words that occur within the social media account.

3. The method of claim 1, wherein determining the first show and the second show comprises determining that buffered data for the first show and the second show include one or more keywords generated from the gathered data.

4. The method of claim 1, further comprising determining the one or more first level toggle triggers based on just the viewing history of the user.

5. The method of claim 4, further comprising determining that the first show has been displayed on the display screen for a predetermined time period and switching the display screen to the second show.

6. The method of claim 1, further comprising displaying on the display screen a listing of the first and second shows and the one or more first level toggle triggers and receiving an input from the user prior to displaying the first show on the display screen during the time of day.

7. A method of displaying shows on a display screen to a user, the method comprising:
gathering data about a user based at least partly on a viewing history of the user that includes time periods and content of previously-viewed shows;
based on the data, determining future viewing time periods and subject matter interests of the user;
for each of the future viewing time periods, determining shows that will be available for viewing that are directed to the subject matter interests of the user;
for each of the future time periods, prioritizing each of the plurality of shows;
based on the data, for each of the shows determining one or more first level toggle triggers that will cause the user to stop watching the show and switch the display screen with each of the one or more first level toggle triggers based on a viewing behavior of the user exhibited during the viewing history and determining different ones of the first level toggle triggers for each of the shows, the first level toggle triggers being real time events that happen while the shows are occurring and that are outside the control of the user;
determining that additional information is available about the user based at least partly on the viewing history of the user that includes the time periods and the content of previously-viewed shows;
based on the additional information, for each of the shows determining one or more second level toggle triggers that are more specific about the content of the show and that will cause the user to stop watching the show and switch the display screen with each of the one or more second level toggle triggers based on a viewing behavior of the user, the second level toggle triggers being real time events that happen while the shows are occurring and that are outside the control of the user;
during the first one of the future time periods, displaying on the display screen a first one of the shows that has the highest priority;
while the first show is being displayed on the display screen determining that one of the second level toggle triggers has occurred without receiving an input from the user; and
responsive to the determining that the second level toggle trigger has occurred and without additional user input while the first show is being displayed, switching the display screen from displaying the first show to a second one of the shows with a lower priority.

8. The method of claim 7, further comprising gathering the data about the user using at least one of a social media account and a user profile.

9. The method of claim 8, further comprising storing the user profile that includes favorite types of shows of the user, favorite actors of the user, and time periods when the user watches shows.

10. The method of claim 7, further comprising receiving a selection from the user of the first and second shows and the first level toggle triggers prior to displaying the first one of the shows on the display screen.

11. The method of claim 7, wherein determining that one of the first level toggle triggers has occurred comprises determining a vocal cue in the second show while the first show is being displayed.

12. The method of claim 7, wherein determining that one of the first level toggle triggers has occurred comprises determining that the first show has been continuously displayed on the display screen for a maximum time period.

13. The method of claim 7, wherein determining that one of the first level toggle triggers has occurred comprises determining a vocal cue in the first show.

14. The method of claim 7, further comprising prioritizing the first level toggle triggers for each of the shows and switching the display screen from displaying the first show to the second show upon determining the occurrence of a highest priority one of the toggle triggers.

* * * * *